(12) United States Patent
Komiyama

(10) Patent No.: US 7,640,043 B2
(45) Date of Patent: Dec. 29, 2009

(54) STRUCTURE TO PREVENT SCRAPING DAMAGE TO FOLDABLE PORTABLE ELECTRIC DEVICE WHEN UPPER AND LOWER UNITS THEREOF ARE IN CONTACT

(75) Inventor: Takehiko Komiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 288 days.

(21) Appl. No.: 10/793,219

(22) Filed: Mar. 5, 2004

(65) Prior Publication Data

US 2004/0180705 A1    Sep. 16, 2004

(30) Foreign Application Priority Data

Mar. 10, 2003   (JP)   ............... 2003-062699

(51) Int. Cl.
*H04M 1/00*   (2006.01)
(52) U.S. Cl. ............. 455/575.3; 455/575.1; 379/433.13
(58) Field of Classification Search ... 455/575.1–575.3; 379/433.11, 433.13, 201.01; 370/352
See application file for complete search history.

(56) References Cited

U.S. PATENT DOCUMENTS 5,335,142 A * 8/1994 Anderson .............. 361/679.07
5,485,517 A   1/1996 Gray
6,845,005 B2 * 1/2005 Shimano et al. ........ 361/679.06
6,999,802 B2 * 2/2006 Kim ........................ 455/575.1

FOREIGN PATENT DOCUMENTS

| JP | 11-275191 A | | 10/1999 |
|----|-------------|---|---------|
| JP | 2002-135380 | | 5/2002 |
| JP | 2002-155923 A | | 5/2002 |
| JP | 2002135380 A | * | 5/2002 |
| JP | 2002-171189 A | | 6/2002 |
| WO | WO 01/15331 A1 | | 3/2001 |

* cited by examiner

*Primary Examiner*—George Eng
*Assistant Examiner*—Muthuswamy G Manoharan
(74) *Attorney, Agent, or Firm*—Sughrue Mion, PLLC

(57) ABSTRACT

An upper unit and lower unit are connected by two hinge portions that allow them to move between open and closed positions and to turn around each other. Undercuts are formed on an edge of the upper or lower unit and extensions are formed on the lower or upper unit not provided with undercuts, to mate with the undercuts of the other unit. For the upper unit to turn around the lower unit, the upper unit must first be raised so as not to touch the extensions. Therefore, the present invention prevents scraping damage of surfaces of the upper and lower units.

10 Claims, 11 Drawing Sheets

STRUCTURE TO PREVENT SCRAPING DAMAGE TO FOLDABLE PORTABLE ELECTRIC DEVICE WHEN UPPER AND LOWER UNITS THEREOF ARE IN CONTACT This application is based upon and claims the benefit of priority from Japanese Patent Application No. 062699/2003 filed on Mar. 10, 2003, the content of which are incorporated by reference.

BACKGROUND OF THE INVENTION

1. Field of the Invention

The present invention relates to foldable portable electric devices, and more particularly, to the prevention of scraping damage to upper and lower units of the foldable portable electric devices which may occur when these upper and lower units fold upon one another.

2. Description of the Related Art

An example of a conventional foldable portable electric device is described in the Japanese Patent Application Publication Laid-Open Kokai No. H11-275191. A perspective view of this conventional foldable portable electric device is shown in FIG. 1.

Referring to FIG. 1, the foldable portable electric device 101 comprises the main body 102, a flip portion 103, damage prevention cushions 104, keys 105 and hinge 106.

The flip portion 103 is connected to the main body 102 through hinge 106. The damage prevention cushions 104, made of an elastic material, are mounted on the main body 102 and protrude from the front surface of the main body 102 in the vicinity of the keys 105.

Referring to FIG. 1, the flip portion 103 turns on a curved hinge 106 to open or close so as to expose or cover the keys 105. When the flip portion 103 is closed, it comes in contact with the damage prevention cushions 104 mounted on the surface of the main body 102 preventing scraping damage to the surfaces of the flip portion 103 and the portions of the main body 102 covered by the flip portion.

SUMMARY OF THE INVENTION

The object of the present invention is to provide a structure to more effectively prevent scraping damage to a foldable portable electric device that may result when upper and lower units thereof come into contact with each other.

Another object of the present invention is to provide a structure to prevent scraping damage to a foldable portable electric device whose upper or lower unit can turn about a hinge to open and close and can also turn about the hinge in a direction to cause the lower and upper units to slide against each other in the closed position.

Still another object of the present invention is to provide a structure to ensure a predetermined clearance between upper and lower units of a foldable portable electric device when the device is in its folded position and one of the upper or lower unit is turned about a hinge against the other of the lower or upper unit.

In order to achieve the foregoing objects, the present invention has an upper unit, a lower unit and a hinge structure allowing the upper unit and the lower unit to turn allowing them to come in contact with each other around an axis of the hinge structure.

The present invention comprises a scraping prevention mechanism having an extension on one of the upper or lower unit and a undercut on the other unit. The scraping prevention mechanism in the present invention prevents turning of the units relative to each other when the foldable portable device is in the folded position.

An extension may be formed on an edge of either the upper or lower unit, and the undercut may be formed on an edge of the other of the upper or lower unit that is not provided with the extension.

In the present invention, the edge may be the end of the upper or lower unit opposite the end connected with the hinge structure, or a side of the upper or lower unit. In one non-limiting embodiment of the present invention the structure may further comprise: a first curved slope with a curved surface formed between extensions; and a second curved slope with a curved surface having virtually the same radius of curvature as the first curved slope, formed between undercuts. The extensions need not be integrated with the upper or lower unit, and may be made as a part initially separate from either the upper or lower unit.

The extension may be configured to light when a call is received to indicate that a call is being received.

Another exemplary embodiment of the present invention has an upper unit and a lower unit and comprises: allowing means for allowing the upper unit and the lower unit to turn around a first axis of a connecting means when the upper unit and lower unit contact each other in a closed position; and rising means for requiring the upper or lower unit to move around a second axis perpendicular to the first axis toward an open position before the upper unit and the lower unit can turn around the first axis of the connecting means to prevent scraping damage to the surfaces of the upper and lower units. The present invention may further comprise. mating means for mating with the rising means when the foldable portable electric device is in the folded position.

In another exemplary embodiment the rising means and mating means may each comprise curved slope means. The rising means may be configured to light when a call is received.

BRIEF DESCRIPTION OF THE DRAWINGS

These and other objects, features and advantages of the invention will be became fully apparent from the following detailed description taken in conjunction with accompanying drawings.

DETAILED DESCRIPTION OF THE EXEMPLARY EMBODIMENTS

Figure 1:
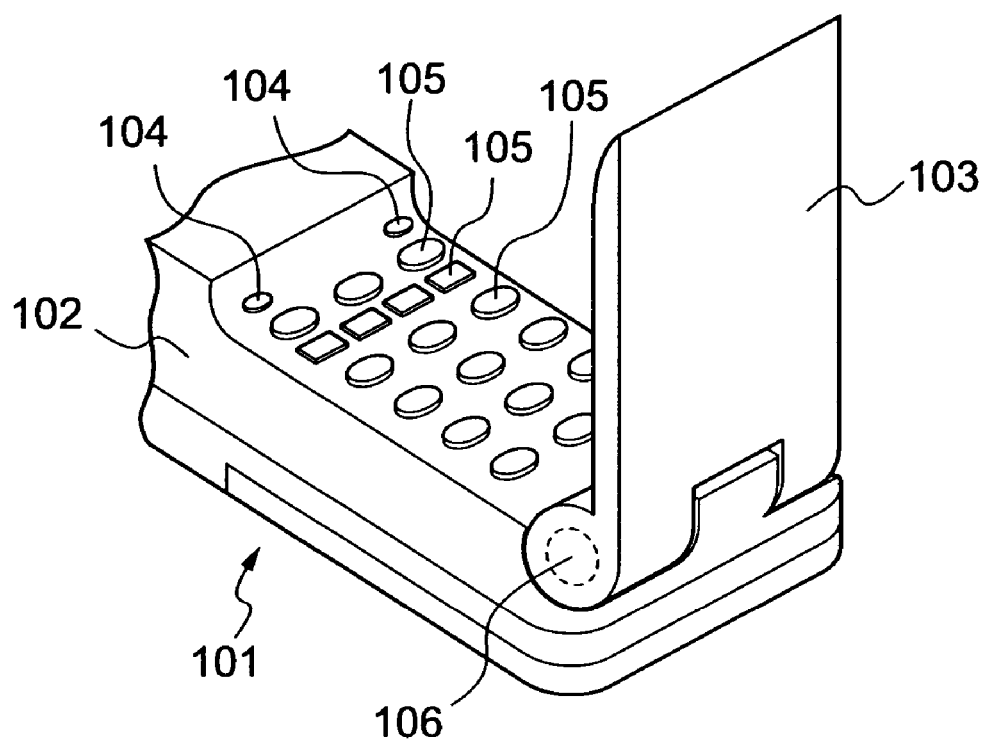
FIG. 1 is a perspective view of a conventional foldable portable electric device.
Figure 2A:
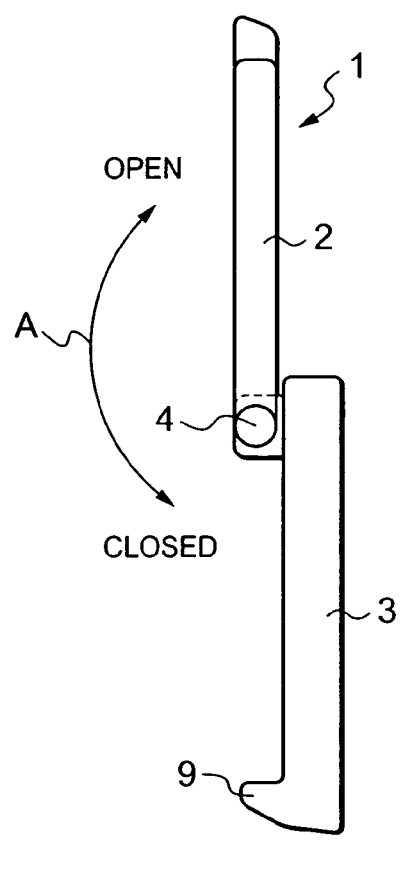
FIGS. 2(a) and 2(b) are side and plan views of an example of a foldable portable electric device in an open state according to a first exemplary embodiment of the present invention.
Figure 2B:
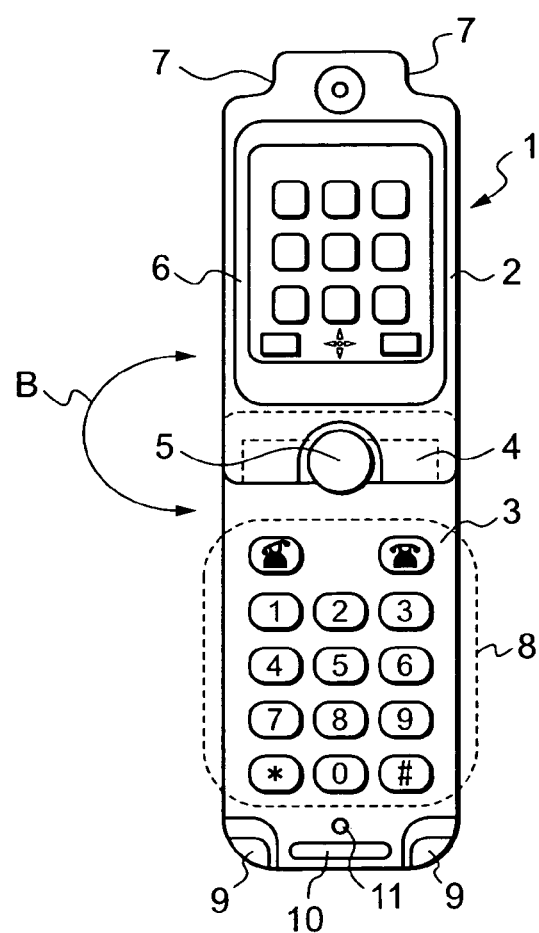

FIGS. 2(*a*) and 2(*b*) show side and plan views of a first exemplary embodiment of the present invention in an open state.

The exemplary embodiments described herein are intended to assist with the understanding of the invention, and are not intended to limit the scope of the invention in any way.

Referring to FIGS. 2(*a*) and 2(*b*), the foldable electric device 1 of the first exemplary embodiment comprises upper unit 2, lower unit 3, hinges 4 and 5, display 6, undercuts 7, keys 8, extensions 9, elastic part 10 and microphone 11.

In FIGS. 2(*a*) and 2(*b*), one end of the upper unit 2 and one end of the lower unit 3 are connected with the hinge 4 so that the upper unit 1 can be opened and closed in a direction A as shown in FIG. 2(*a*). Furthermore, another hinge 5 which may be part of hinge 4 but may not be a separate hinge, is provided so that the upper unit 2 can turn around the hinge 5 against the lower unit 3 in a direction B as shown in FIG. 2(*b*). The detail explanation of the turning of the upper unit 2 around the hinge 5 will be described by using FIGS. 3(*a*), 3(*b*) and 5.

Figure 4C:
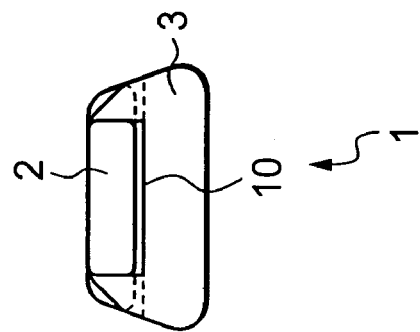
FIGS. 4(a) to 4(c) are side, plane and another side views of an example of a foldable portable electric device in a closed state according to the first exemplary embodiment of the present invention.
Figure 4B:
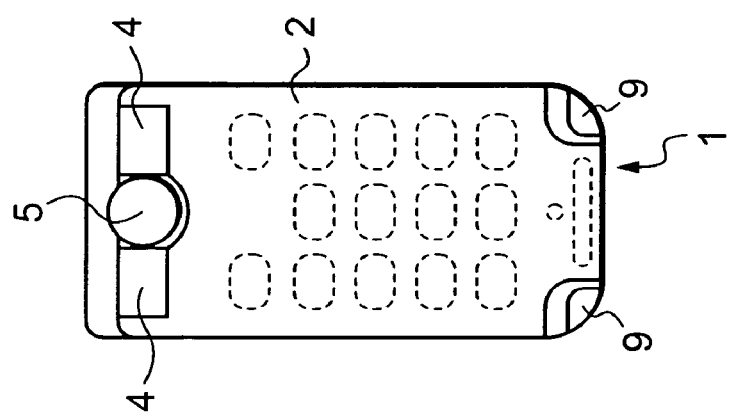
Figure 4A:
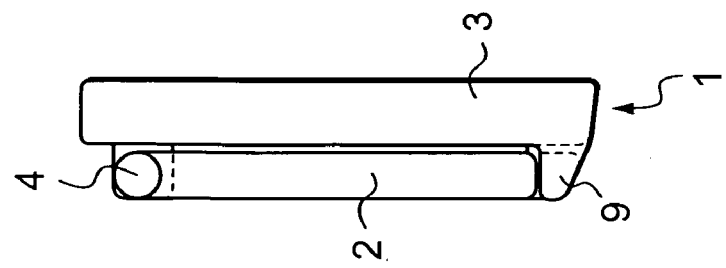

On the upper unit 2, as shown in FIG. 2(*b*), the display 6 may be located on the front side thereon. The undercuts 7 may be formed at the right and left corners of the end of upper unit 2 opposite the side of the upper unit connected with hinges 4 and 5. The display 6 may be made of a transparent material such as acrylic material to protect a liquid crystal display device (LCD) installed inside the upper unit 2. The undercuts 7 may be formed in positions to mate with extensions 9 of the lower unit 3 and allow the extensions 9 to fit into the undercuts when the upper unit 2 and the lower unit 3 are in a correctly closed state, as shown in FIGS. 4 (*a*) to 4(*c*) and 5.

On the lower unit 3, as shown in FIG. 2 (*b*), keys 8 may be located on its front side and may include numeric and other function keys. The microphone 11 may be located on the front side of the lower unit 3. The extensions 9 may be formed respectively at the right and left corners of the end opposite the end connected with the hinges 4 and 5 of the lower unit 3. The tips of the extensions 9 may be positioned at approximately the same height as the front side of the upper unit 2 in an open state as shown in FIG. 2(*a*). The keys 8 may be formed to be slightly higher than the front side surface of the lower unit 3 with consideration for manipulability.

In the center of a leading edge of the lower unit 3, an elastic part 10 such as rubber of a rectangular solid shape, which is slightly higher than the height of the keys 8, may be installed. This elastic part 10 comes in contact with the front surface of the upper unit 2 in a closed state, thereby ensuring a clearance between the upper unit 2 and the lower unit in the closed position.

Figure 3B:
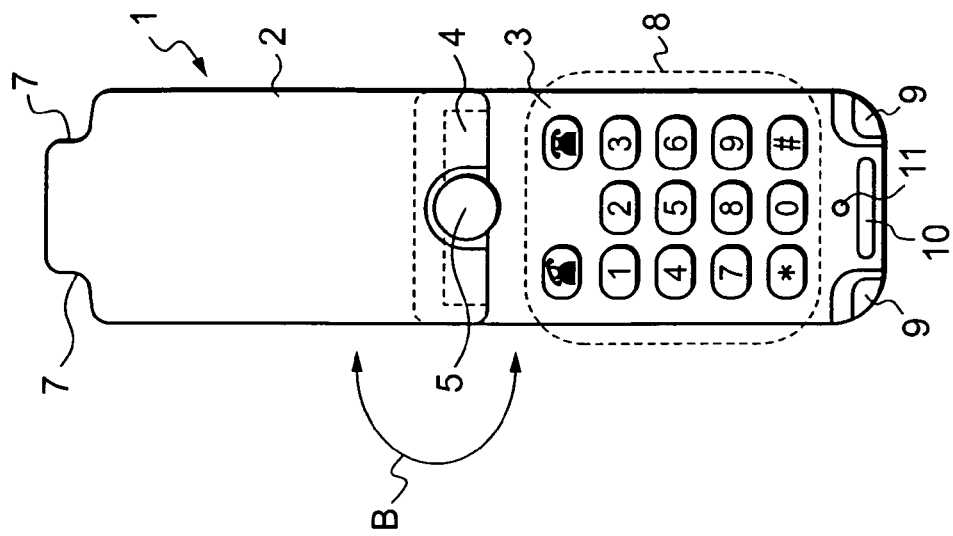
FIGS. 3(a) and 3(b) are perspective and plane views of an example of a foldable portable electric device illustrated to explain the operation as an upper unit turns around a hinge while in an open state, according to the first exemplary embodiment of the present invention.
Figure 3A:
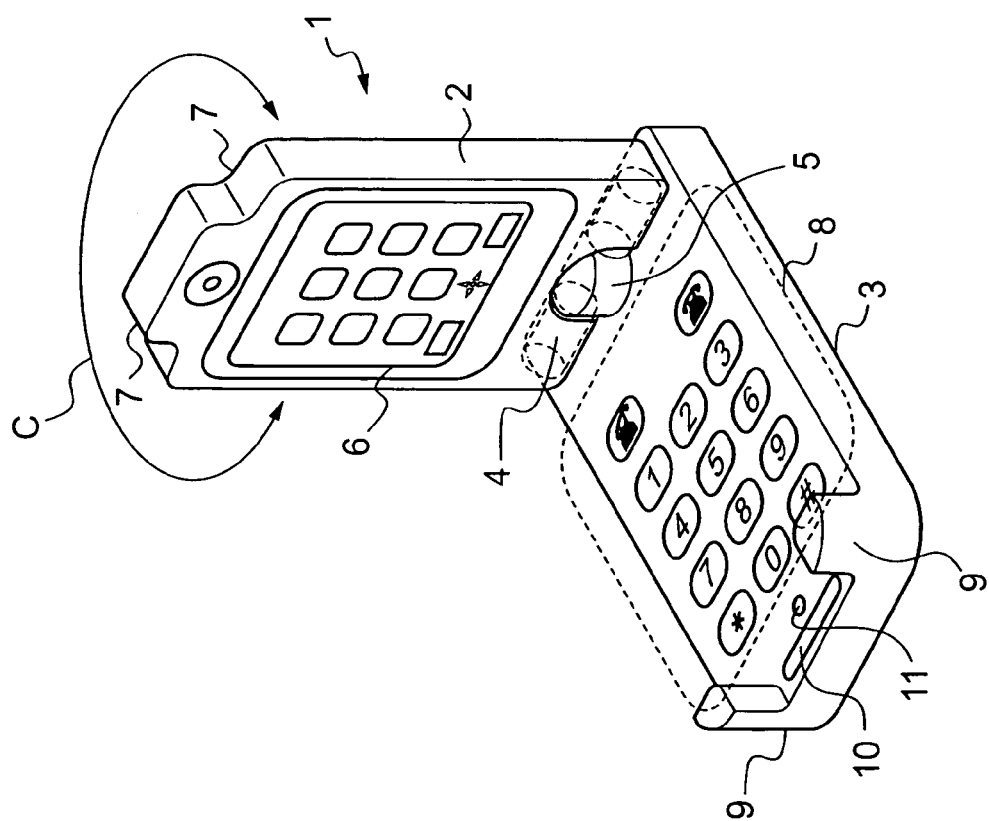

FIGS. 3(*a*) and 3(*b*) show perspective and plane views of a first exemplary embodiment in order to explain the turning of the upper unit 2 around a hinge 5 in an open state.

In FIG. 3(*a*), the upper unit 2 and the lower unit 3 can be turned relative to each other around the hinge 5 in a direction C. Therefore, the back side of the upper unit 1 may be positioned as shown in FIG. 3(*b*) so that the display 6 faces in the direction opposite the facing direction of the keys 8.

In FIG. 3(*b*), the upper unit 1 can be folded through hinge 4 and be turned around hinge 5 in a direction B.

Now, a closed state of a foldable portable electric device 1 in accordance with an exemplary embodiment of the present invention is explained referring to FIGS. 4(*a*) to 4(*c*) and 5.

Figure 5:
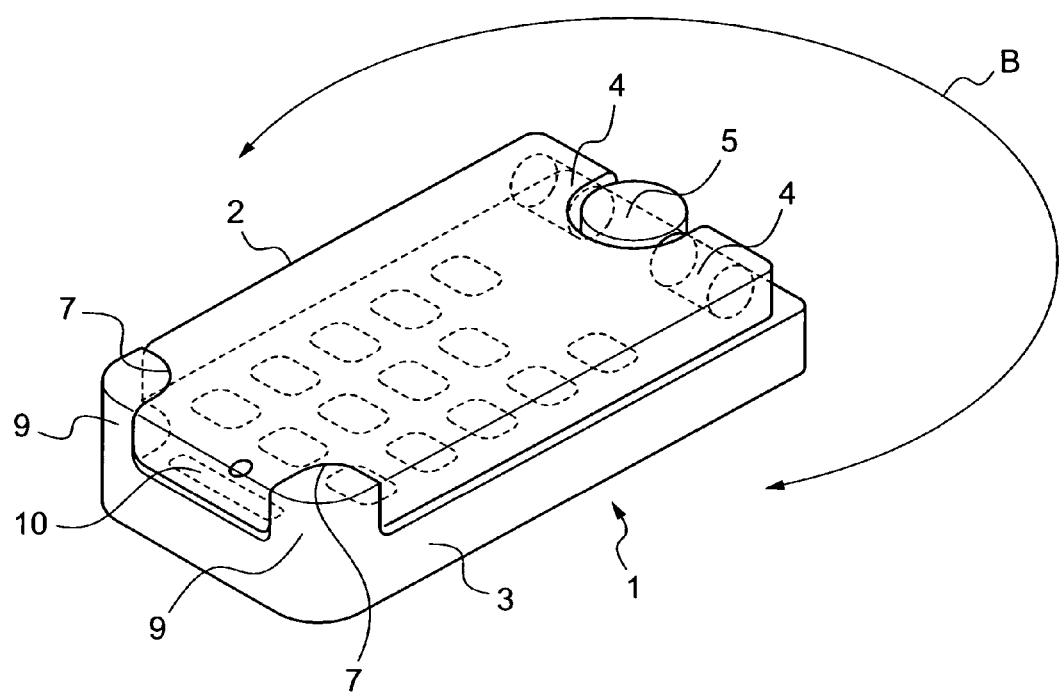
FIG. 5 is a perspective view of an example of a foldable portable electric device illustrated to explain the operation as an upper unit turns around a hinge in a closed state according to the first exemplary embodiment of the present.

FIGS. 4(*a*) to 4(*c*) show side, plane and another side views of a first exemplary embodiment of the present invention in a closed state. FIG. 5 shows a perspective view of the first exemplary embodiment in order to explain the turning the upper unit 2 around the hinge 5 in a closed state.

In FIGS. 4(*a*) to 4(*c*) and 5, the front side of the upper unit 2 (the display 6 is located thereon) is contacted with the front side of the lower unit 2 (the keys 8, the elastic part 10 and the microphone 11 may be located thereon). To do so, the upper unit 2 is folded through the hinge 4 in a direction A in the situation shown in FIGS. 2(*a*) and 2(*b*) or turned around the hinge 5 in a direction B in the situation shown in FIG. 3(*b*).

In the closed state, the extensions 9 and the undercuts 7 are placed in an engaged state. Thus, the turning motion of the upper unit 2 against the lower unit 3 is blocked in the direction of arrow B around the hinge 5. Therefore, in the present invention, it is possible to avoid scraping damage to surfaces of the upper and lower units 2 and 3 contacting each other in a closed state even if rotation moment is forced from outside to the foldable portable electric device 1. Particularly, in the case that the display 6 contacts with the keys 8 in a closed state as shown in FIGS. 4(*a*) to 4(*c*) and 5, scraping damage of the display 6 and the keys 8 is avoided.

In order to turn the upper unit 2 in the direction B in closed or open states, the upper unit 2 must be raised on the axis of the hinge 4 for opening and closing without touching the protrusions 9. Therefore, the present invention can prevent a scratch damage on the surfaces of the upper and lower units 2 and 3 when the upper unit 2 is turned around the hinge 5 by the user.

In the present invention, there is no limitation on the shape and height of the extensions 9, provided the extensions can avoid having the surface of the upper unit 2 rub against the surface of the lower unit 3 and can avoid having the display 6 rub against the keys 8 when the upper unit 2 is turned.

Figure 6A:
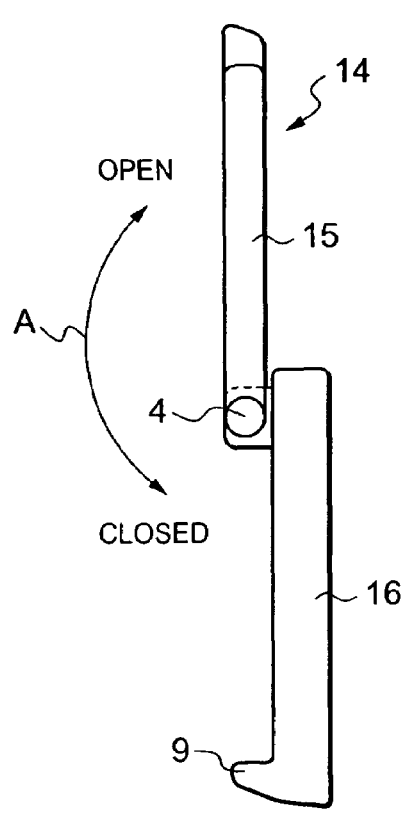
FIGS. 6(a) and 6(b) are side and plan views of a preferred example of a foldable portable electric device in an open state according to a second exemplary embodiment of the present invention.
Figure 6B:
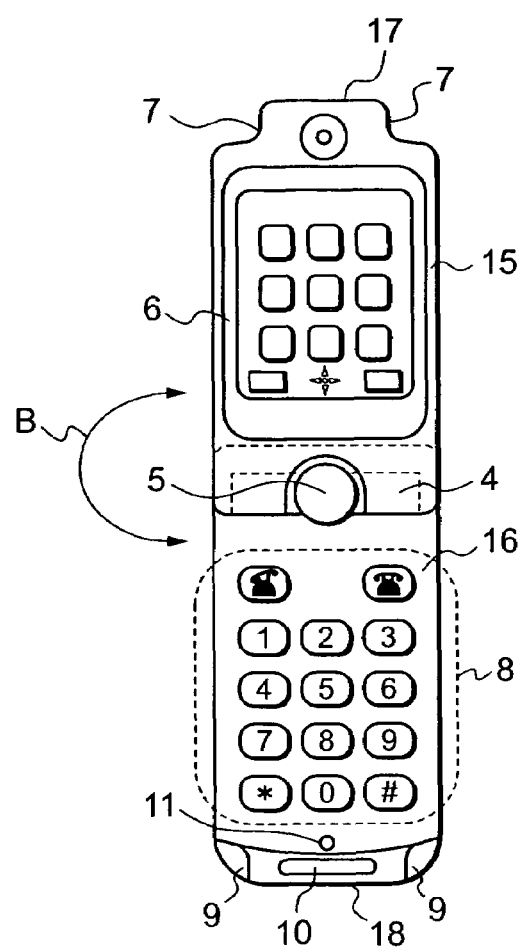
Figure 7C:
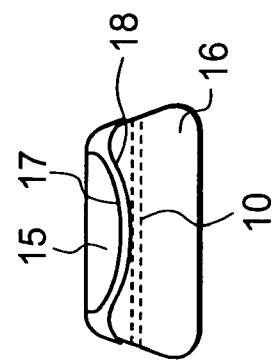
FIGS. 7(*a*) to 7(*c*) are side, plane and another side views of an example of a foldable portable electric device in a closed state according to the second exemplary embodiment of the present invention.
Figure 7B:
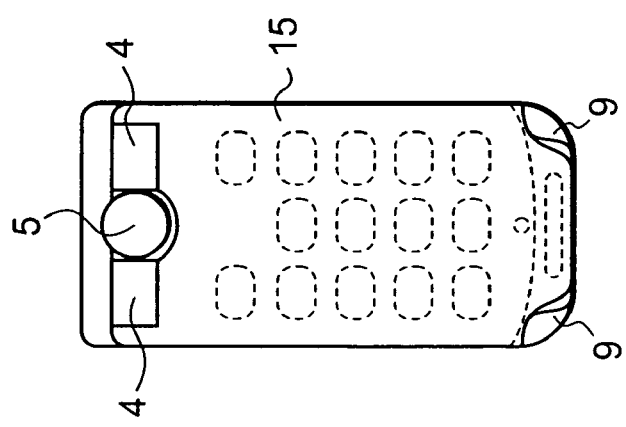
Figure 7A:
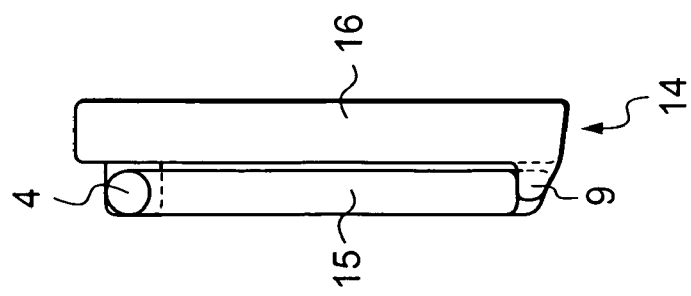

A second exemplary embodiment of the present invention is illustrated in FIGS. 6(*a*) and 6(*b*) which show side and plan views of the second exemplary embodiment in an open state. FIGS. 7(*a*) to 7(*c*) shows side, plane and another side views of the second exemplary embodiment in a closed state.

Referring to FIGS. 6(*a*), 6(*b*) and 7(*a*) to 7(*c*), the difference between the structure of the second embodiment and the first embodiment is that the edge between the two undercuts 7 of the upper unit 15 is shaped as a convex curved slope 17 on the surface where the display 6 is formed. Furthermore, on the lower-unit 16, the edge to be formed with the extensions 9 is shaped as a concave curved slope 18 on the surface where the keys 8 is formed. The curved slopes 17 and 18 respectively form corresponding partial arcs of concentric curves with virtually the same curvature radius, and are formed to mate with each other substantially without a gap when in a closed state. In this embodiment, extensions may be but are not necessarily formed by forming the concave portion with a diameter less than the widths of the lower unit.

Figure 8:
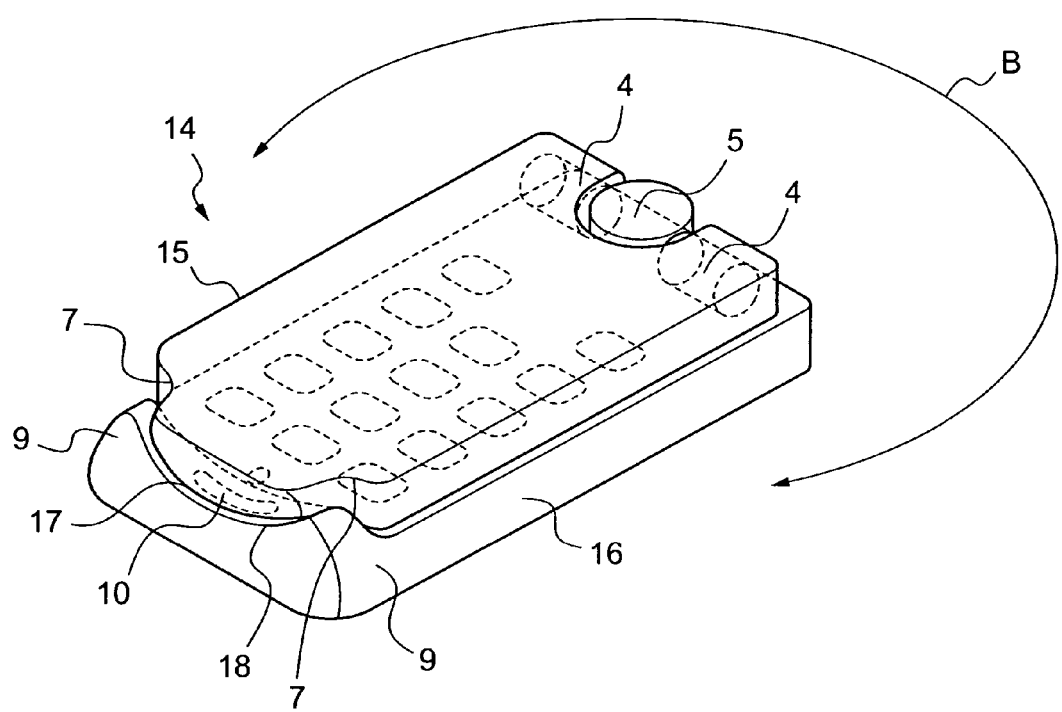
FIG. 8 is a perspective view of a preferred example of a foldable portable electric device illustrated to explain the operation as an upper unit turns around a hinge in a closed state according to the second exemplary embodiment of the present.

FIG. 8 shows a perspective view of the second exemplary embodiment of the present invention in order to explain the turning of the upper unit 15 around the hinge 5 in a closed state. In the second embodiment, when the upper unit 15 is turned in the direction of arrow B, the upper unit 15 moves along the curved slope 18 and gets over the extensions 9, so that the upper unit 15 can make a smooth turning motion.

According to the second exemplary embodiment, therefore, it is possible to avoid scratches and scraping of the display 6 of the upper unit 15 and of the keys 8 of the lower unit 16 when/the foldable portable electric device 14 is turned around the hinge 5. Furthermore, the second exemplary embodiment may be considered superior to the first exemplary embodiment in terms of exterior appearance, because of the shape of the edge of the upper unit 15 and the edge of the lower unit 16 which have the curved slopes 17 and 18, respectively. There is no limitation on the height of the extensions 9. The shape of the curved slopes 17 and 18 avoid scraping damage of the display 6 and the keys 8 when the upper unit 15 is turned around hinge 5.

Figure 9:
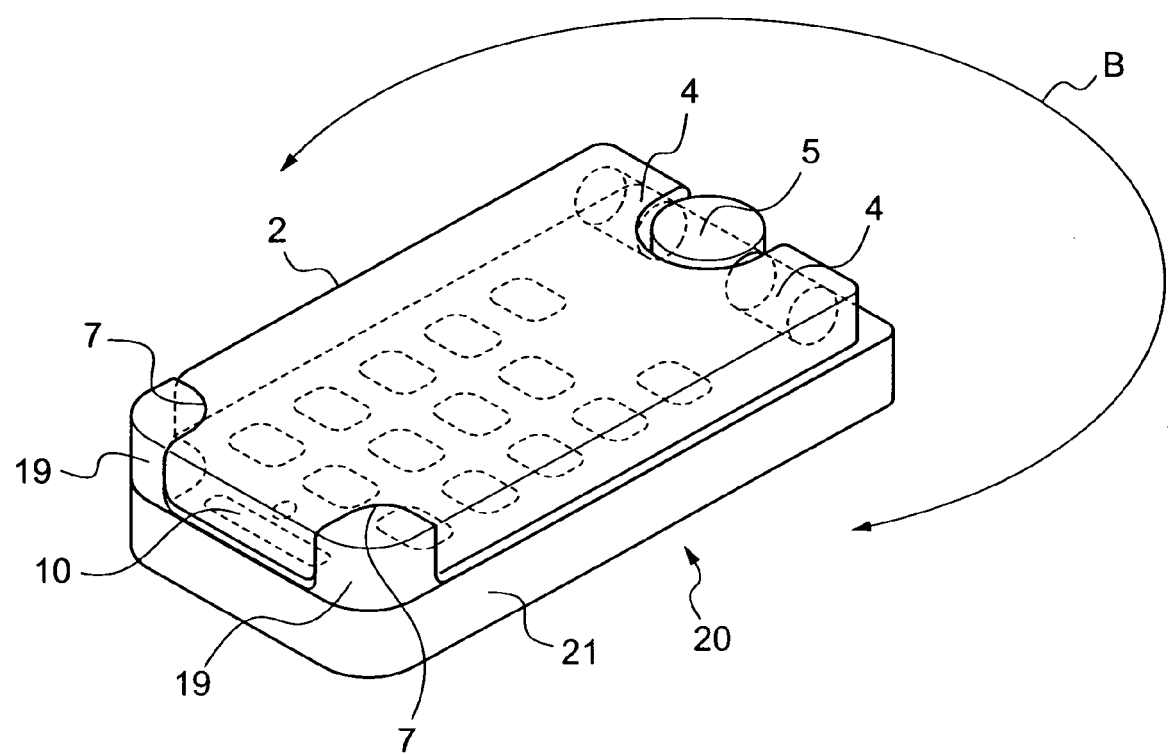
FIG. 9 is a perspective view of an exemplary example of a foldable portable electric device illustrated to explain the operation as an upper unit turns around a hinge in a closed state according to a third exemplary embodiment of the present.

A third exemplary embodiment of the present invention is illustrated in FIG. 9 that shows a perspective view of the third exemplary embodiment.

In the third exemplary embodiment, the extensions 19 are made separate from the lower unit 21 and joined thereto; while in the first and second exemplary embodiments, the protrusions 9 are formed integrally with the lower unit 3 or 16.

Because the extensions 19 are made as separate parts from the lower unit 21 in this embodiment, design restrictions can be relaxed. That is, for example, the extensions 19 may be colored in a different color from the colors of the upper unit 2 and the lower unit 21 and may be configured to light when a call is received as an indication of receiving a call.

Figure 10:
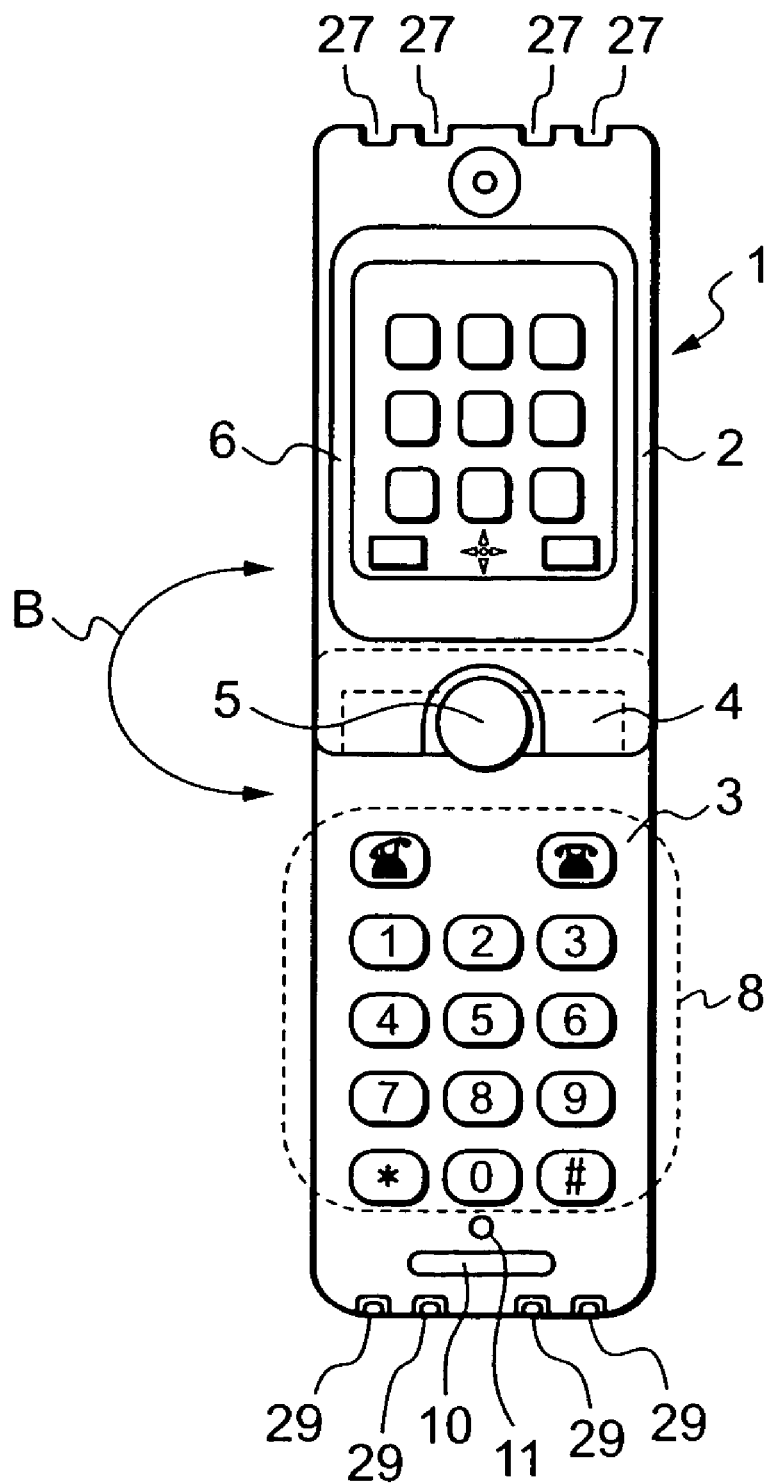
FIG. 10 is a plane view of an example of a foldable portable electric device in an open state according to a fourth exemplary embodiment of the present invention.

A fourth exemplary embodiment of the present invention is illustrated in FIG. 10 that shows a plane view of the fourth exemplary embodiment of the present invention in an open state.

In the fourth exemplary embodiment, the undercuts 27 may be formed at the end of the upper unit 2 opposite the side of the upper unit connected with hinges 4 and 5. On the other hand, the extensions 29 may be formed at the lower unit 3 to allow the extensions 29 to fit into the undercuts 27 when the upper unit 2 and the lower unit 3 are in a correctly closed state.

In the fourth exemplary embodiment, the number of combinations of the undercuts 27 and extensions 29 is four pairs as an example. However, the number of these combinations is not limited to the four pairs. Also, a location of the undercuts 27 and extensions 29 formed on the end of the upper unit 2 and lower unit 3, respectively, is not limited to the positions shown.

Figure 11:
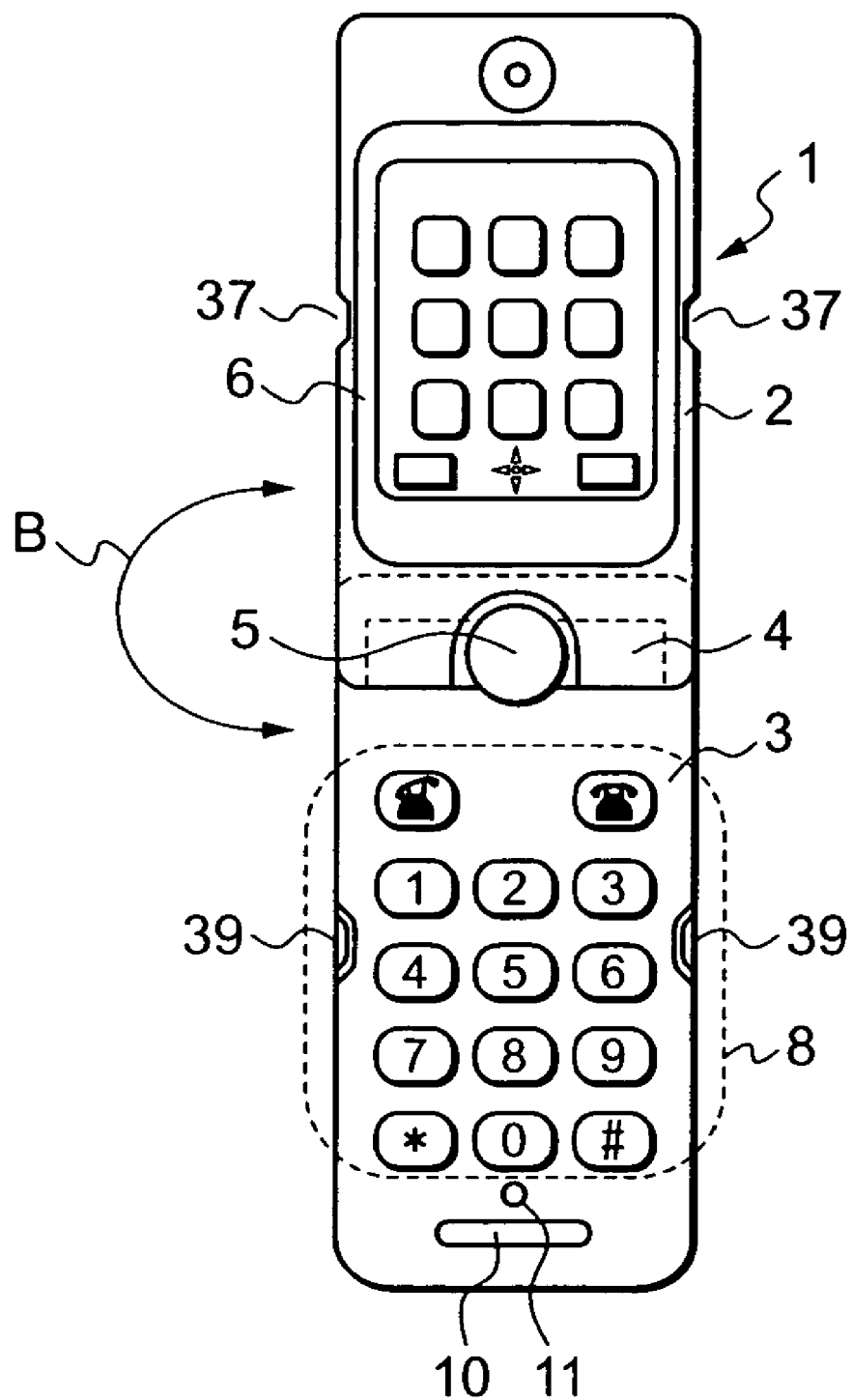
FIG. 11 is a plane view of an example of a foldable portable electric device in an open state according to a fifth exemplary embodiment of the present invention.

A fifth exemplary embodiment of the present invention is illustrated in FIG. 11 that shows a plane view of the fifth exemplary embodiment of the present invention in an open state.

In the fifth exemplary embodiment, the undercuts 37 may be formed at the side edge of the upper unit 2 and the extensions 39 may be formed at the side edge of the lower unit 3 to allow the extensions 39 to fit into the undercuts 37 when the upper unit 2 and the lower unit 3 are in a correctly closed state.

In the fifth exemplary embodiment, the number of combinations of the undercuts 37 and extensions 39, and location of the undercuts 37 and extensions 39 formed on the side edge of the upper unit 2 and lower unit 3, respectively, is not limited to the positions illustrated in FIG. 11.

The present invention is applicable to a cellular phone, particularly a cellular phone including a camera unit.

Furthermore, while the elastic part 10 having a predetermined height prevents damage to the keys 8 and the display 6 due to contact in a closed state because the elastic part 10 ensures a predetermined clearance between the keys 8 and the display 6 in a closed state, only the extensions 9 or 19 may make it possible to avoid scratches, scraping, and the like. The elastic part 10 may not be necessarily included in the present invention.

While the extensions 9 or 19 are provided on the lower unit 3, 16 or 21 in the discussed embodiments, the extensions 9, 19, 39 or 30 may be provided on the upper unit 2 or 15. In this case, the undercuts 7, 17, 27 or 37 must be provided on the lower unit 3, 16 or 21. Likewise, the elastic part 10, if used, may be provided on the upper unit 2 or 15.

Moreover, the extensions 9, 19, 29 or 39 may be separate parts from the units in the second, fourth and fifth exemplary embodiment.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A foldable portable electric device having an upper unit and a lower unit, comprising:

a hinge structure which allows said upper unit and said lower unit to move around at least a first axis for folding and unfolding said units and a second axis which is substantially perpendicular to said first axis and is arranged on one side of a folded face of one of said units, and a scraping prevention mechanism which has two extensions being formed at two corners of the other side of said folded face of one of said units and two undercuts being formed on the other unit so as to engage with said extensions respectively while folded, wherein the other unit moves around said second axis in a parallel direction to said folded face of the one of said units, and wherein said scraping prevention mechanism prevents said units from moving around said second axis by a portion of the other unit that is located between said extensions when said foldable portable electric device is in the folded position.

2. The foldable portable electric device as claimed in claim 1, wherein the other side of said folded face is the opposite end of said upper or lower unit connected with said hinge structure.

3. The foldable portable electric device as claimed in claim 1, wherein the other side of said folded face is a side end of said upper or lower unit.

4. The foldable portable electric device as claimed in claim 2, wherein said foldable portable electric device has at least two pairs of extensions and undercuts, further comprising:

a first curved slope with a curved surface formed between said extensions; and a second curved slope with a curved surface having substantially the same curvature radius as said first curved slope, formed between said undercuts.

5. The foldable portable electric device as claimed in claim 1, wherein each extension is a separate part joined to either said upper or lower unit.

6. The foldable portable electric device as claimed in claim 1, further comprising: an elastic part for ensuring a clearance between said upper and lower units.

7. The foldable portable electric device as claimed in claim 1, wherein said foldable portable electric device is a cellular phone.

8. The foldable portable electric device as claimed in claim 5, wherein said foldable portable electric device is a cellular phone.

9. The foldable portable electric device as claimed in claim 8, wherein one of said extensions is configured to light when a call is received.

10. The foldable portable electric device according to claim 1, wherein the foldable portable device is folded into the folded position by rotating about the first axis and the second axis remains in the same position with respect to the lower unit in both the folded position and an unfolded position, wherein the scraping prevention mechanism prevents turning of said units relative to each other about the second axis.

\* \* \* \* \*